(12) United States Patent
Bianco Mengotti (10) Patent No.: US 11,794,892 B2
(45) Date of Patent: Oct. 24, 2023

(54) TAIL SITTER

(71) Applicant: LEONARDO S.P.A., Rome (IT)

(72) Inventor: Riccardo Bianco Mengotti, Samarate (IT)

(73) Assignee: LEONARDO S.P.A., Rome (IT)

( * ) Notice: Subject to any disclaimer, the term of this patent is extended or adjusted under 35 U.S.C. 154(b) by 408 days.

(21) Appl. No.: 16/973,308

(22) PCT Filed: Jun. 28, 2019

(86) PCT No.: PCT/IB2019/055517
§ 371 (c)(1),
(2) Date: Dec. 8, 2020

(87) PCT Pub. No.: WO2020/003240
PCT Pub. Date: Jan. 2, 2020

(65) Prior Publication Data
US 2021/0245876 A1   Aug. 12, 2021

(30) Foreign Application Priority Data

Jun. 28, 2018 (EP) .................................. 18180590

(51) Int. Cl.
*B64C 29/02* (2006.01)
*B64C 27/54* (2006.01)
(Continued)

(52) U.S. Cl.
CPC .............. *B64C 29/02* (2013.01); *B64C 27/54* (2013.01); *B64C 39/024* (2013.01);
(Continued)

(58) Field of Classification Search
CPC ................................................... B64C 29/02
See application file for complete search history.

(56) References Cited

U.S. PATENT DOCUMENTS 1,786,545 A * 12/1930 Noeggerath ........ B64C 29/0033
244/7 C
3,350,035 A   10/1967 Schlieben
(Continued)

FOREIGN PATENT DOCUMENTS

CN   106938701   7/2017
CN   206327567   7/2017
(Continued)

OTHER PUBLICATIONS

Inderjitchopra, "High-Speed Quad-Rotor Biplane Micro Air Vehicle for Multiple-Role Missions", and Proceedings of the 4th Asian-Australian Rotorcraft Forum, Nov. 2015.
(Continued)

*Primary Examiner* — Philip J Bonzell
*Assistant Examiner* — Michael B. Kreiner
(74) *Attorney, Agent, or Firm* — Leason Ellis LLP (57) ABSTRACT

A tail sitter aircraft is described that comprises: a fuselage arranged vertically in a take-off/landing position and transversely to a vertical direction in a cruising position of the aircraft; a single wing; at least two first engines configured to exert respective first thrusts directed along respective first axes on the tail sitter; and at least two second engines rotating about respective second axes arranged above said first axes of the first engines, with reference to the cruising position; the at least two second engines being configured to exert respective second thrusts directed along respective second axes on the tail sitter; the first and second engines being carried by the single wing; the single wing comprises a first portion and a second portion mutually staggered from one another; the second portion being arranged above said first portion, with reference to said cruising position; said first portion comprises two half-wings, extending from opposite lateral sides of the fuselage; the wing further
(Continued)

comprises a third portion arranged below said first portion with reference to said cruising position of said aircraft.

12 Claims, 5 Drawing Sheets

(51) Int. Cl.
    *B64C 39/02*     (2023.01)
    *B64C 39/06*     (2006.01)
    *B64D 27/02*     (2006.01)
    *B64D 31/00*     (2006.01)
    *B64U 10/00*     (2023.01)

(52) U.S. Cl.
    CPC ............ *B64C 39/068* (2013.01); *B64D 27/02* (2013.01); *B64D 31/00* (2013.01); *B64U 10/00* (2023.01)

(56) References Cited

U.S. PATENT DOCUMENTS

| | | | |
|---|---|---|---|
| 5,114,096 A | 5/1992 | Wernicke | |
| 9,550,567 B1* | 1/2017 | Erdozain, Jr. | B64C 29/02 |
| 9,714,087 B2* | 7/2017 | Matsuda | B64C 29/02 |
| 9,963,228 B2* | 5/2018 | McCullough | G08G 5/025 |
| 10,315,761 B2* | 6/2019 | McCullough | B64C 29/02 |
| 10,336,450 B2* | 7/2019 | Graham | G05D 1/102 |
| 10,518,880 B2* | 12/2019 | Kimchi | B64C 27/26 |
| 10,556,680 B2* | 2/2020 | Fenny | B64C 39/024 |
| 10,597,164 B2* | 3/2020 | Oldroyd | G05D 3/00 |
| 10,618,647 B2* | 4/2020 | McCullough | B64C 39/02 |
| 10,981,661 B2* | 4/2021 | Oldroyd | B64C 39/08 |
| 11,084,579 B2* | 8/2021 | Ivans | B64U 50/13 |
| 2011/0042508 A1* | 2/2011 | Bevirt | B64C 39/024 |
| | | | 244/75.1 |
| 2011/0042510 A1 | 2/2011 | Bevirt et al. | |
| 2015/0014475 A1 | 1/2015 | Taylor | |
| 2016/0144957 A1 | 5/2016 | Claridge | |
| 2017/0158327 A1 | 6/2017 | Wilford | |
| 2017/0166305 A1 | 6/2017 | Arlton et al. | |
| 2017/0283052 A1 | 10/2017 | Moshe | |
| 2017/0297699 A1 | 10/2017 | Alber et al. | |
| 2018/0044011 A1 | 2/2018 | Reichert | |
| 2020/0317332 A1* | 10/2020 | Didey | B64C 39/08 |

FOREIGN PATENT DOCUMENTS

| | | |
|---|---|---|
| DE | 102011012503 | 8/2012 |
| DE | 202017104421 | 9/2017 |
| EP | 3243750 | 11/2017 |
| EP | 3 263 445 | 1/2018 |
| EP | 3263445 | 1/2018 |
| WO | WO 2016/209350 | 12/2016 |
| WO | 2018152258 | 8/2018 |

OTHER PUBLICATIONS

Notice of Reasons for Refusal in JP Application No. 2020-572754, dated Apr. 2, 2023, an English translation attached hereto (12 pages).

* cited by examiner

TAIL SITTER

CROSS-REFERENCE TO RELATED APPLICATIONS

This patent application is a U.S. National Phase Application under 35 U.S.C. § 371 of International Patent Application No. PCT/IB2019/055517, filed on Jun. 28, 2019, which claims priority from European patent application no. 18180590.4 filed on Jun. 28, 2018, all of which are incorporated by reference, as if expressly set forth in their respective entireties herein.

TECHNICAL FIELD

The present invention relates to a tail sitter.

BACKGROUND ART

Since the mid twentieth century, there has been awareness in the aeronautics industry of the need for aircrafts capable of vertical Take-off and landing and having sufficiently high cruising speeds to be able to swiftly cover medium/long haul routes.

A partial solution to this need is constituted by helicopters and convertiplanes, which however are not without drawbacks.

Helicopters actually have a maximum speed of approximately 350 km/h. Convertiplanes require rotating the nacelles with the rotors between the helicopter configuration and the aeroplane configuration, thereby being particularly complex from the constructional standpoint.

A further solution proposed for satisfying this need is constituted by VTOL (Vertical Take-off Landing) aircrafts. These have a Take-off/landing configuration with the fuselage horizontal and engines capable of orientating the thrust in a vertical direction during Take-off/landing or in a horizontal direction during horizontal translational flight.

Despite their widespread use and their efficiency, the constructional configuration of VTOL aircrafts is particularly complex. This derives from the fact that it is necessary to selectively orientate the direction of thrust of the engines according to the aircraft's Take-off/landing/flight conditions.

A further solution proposed for meeting the aforementioned need was developed between the forties and sixties of the twentieth century and is constituted by tail sitters.

These aircrafts basically comprise a fuselage, a pair of half-wings, one or more drive members normally carried by the fuselage and a tail fin equipped with movable surfaces to control the aircraft.

The flight profile of a tail sitter contemplates Take-off with the fuselage of the aircraft positioned vertically, a first transition phase in which the aircraft rotates ninety degrees to assume a cruising position, and a second transition phase in which the aircraft returns to having the fuselage positioned vertically to perform the landing.

During the Take-off and landing phases, the tail sitter rests on the ground by means of landing members, generally carried by the tail fin of the aircraft.

Subsequently, the thrust of the motors counters the weight of the tail sitter in Take-off/landing conditions and the aerodynamic resistance of the air in flight conditions.

Prototypes of these solutions are represented by the Lockheed XFV-1, Convair XFY-1 Pogo and Ryan X-13 Vertijet aircraft.

US-2017/0297699, CN-A-106938701, US-A-2017/0166305, WO-A-2016/209350, and U.S. Pat. No. 5,114,096 describe known tail sitter solutions.

Tail sitters are particularly advantageous as they have a substantially similar configuration to that of aeroplanes and, therefore, particularly simple to construct when compared with that of convertiplanes and VTOL aircraft.

Furthermore, unlike helicopters, tail sitters do not have particular limits regarding the maximum cruising speed, which is comparable to that of conventional aeroplanes.

Nevertheless, the vertical Take-off and landing position of tail sitters imposes geometrical and operational constraints on the shape of the half-wings, especially when the weight of the tail sitter exceeds a certain threshold value. For example, it is necessary to minimize the surface of the half-wing exposed to the wind, so as to minimize sensitivity to gusts of wind during the Take-off and landing phases.

In consequence, the performance of tail sitters in the cruising position is penalized by the configuration of these half-wings.

This has substantially prevented the effective use of tail sitters. In fact, most of the previously mentioned prototypes have never lead to actually deployed aircrafts. In consequence, the use of tail sitters has been substantially abandoned over the last fifty years, mainly in favour of VTOL aircraft.

In order to increase the aerodynamic efficiency of tail sitters in cruising conditions, the aircraft described in US-A-2017/0166305 has been proposed.

This aircraft basically comprises:

a fuselage;

a pair of first engines arranged above the fuselage; and a pair of second engines arranged below the fuselage.

In a first embodiment of the aircraft described in US-A-2017/0166305, the aircraft comprises a pair of flat half-wings projecting from respective mutually opposite lateral sides of the fuselage.

In this first embodiment, the first engines are fixed to respective upper surfaces of the half-wings via respective first support structures projecting in a cantilever fashion above the half-wings, and the second engines are fixed to respective lower surfaces of the half-wings via respective second support structures projecting in a cantilever fashion below the half-wings.

More specifically, the half-wings are of finite length and flat. The axes of the first and second engines are staggered with respect to the outline half-wings and respectively arranged above and below this profile.

In a second embodiment, the aircraft described in US-A-2017/0166305 comprises:

first half-wings, anhedral and projecting in a cantilever fashion from mutually opposite lateral sides of the fuselage; and second half-wings, dihedral, shorter than the first half-wings and projecting in a cantilever fashion from respective mutually opposite lateral sides of the fuselage.

The first engines are arranged below the fuselage and are fixed to the lower surfaces of respective first half-wings via respective third support structures.

The second engines are arranged at the free ends of the second half-wings.

More specifically, the first and second half-wings are of finite length and flat. The axes of the first and second engines are staggered with respect to the profile of the respective first half-wings and respectively arranged above and below this profile.

Due to the fact that the axes of the first and second engines are staggered with respect to the half-wings, the aircraft described in US-A-2017/0166305 thus implements a RBW (Rotor-Blown Wing) configuration, in which the half-wings are struck by airflows generated by the first and second engines.

This configuration allows to increase the lift of the half-wing through deflection of the air current towards the half-wings, creating overpressure on the belly of the half-wings and a depression on the top surface of the half-wings, with a consequent increase in the lift generated by the half-wings.

The presence of the support structures and, with reference to only the second embodiment, the presence of the first and second half-wings projecting in a cantilever fashion from the fuselage makes the configuration of the aircraft described in US-A-2017/0166305 particularly complex to construct.

There is awareness in the industry of the need to have tail sitters equipped with aerodynamically efficient wing structures so as to increase performance in cruising conditions and, at the same time, having the simplest possible configuration.

EP-A-3263445 discloses a tail-sitter according to the preamble of claim 1.

US-A-2017/0158327 discloses a UAV with wing-plate assenblies providing efficient vertical takeoff and landing capability.

DE-U-202017104421 discloses an unmanned aerial vehicle, comprising: a main body; a fixed wing fixed on both sides of the main body; a plurality of rotors connected to both sides of the fixed wing by respective rotor support members; an airborne sensor system for collecting flight data of the aircraft; and a flight control system coupled to the airborne sensor system for adjusting the states of the fixed wing and/or the rotors and the further flight state of the aircraft based on flight data.

DE-A-102011012503 discloses an ultralight aircraft for transporting loads, comprising a quadrangular fuselage, a plurality of individually controllable rotors arranged on the fuselage and a boxed wing.

US-A-2016/0144957 discloses a high speed multi rotor vertical takeoff and landing aircraft.

DISCLOSURE OF INVENTION

The object of the present invention is to provide a tail sitter that enables satisfying the aforementioned need in a simple and inexpensive manner.

BRIEF DESCRIPTION OF THE DRAWINGS

The aforementioned object is achieved by the present invention as claimed in claim 1.

For a better understanding of the present invention, one preferred embodiment will be described hereinafter, purely by way of a non-limitative example and with reference to the accompanying drawings, in which.

BEST MODE FOR CARRYING OUT THE INVENTION

Figure 1:
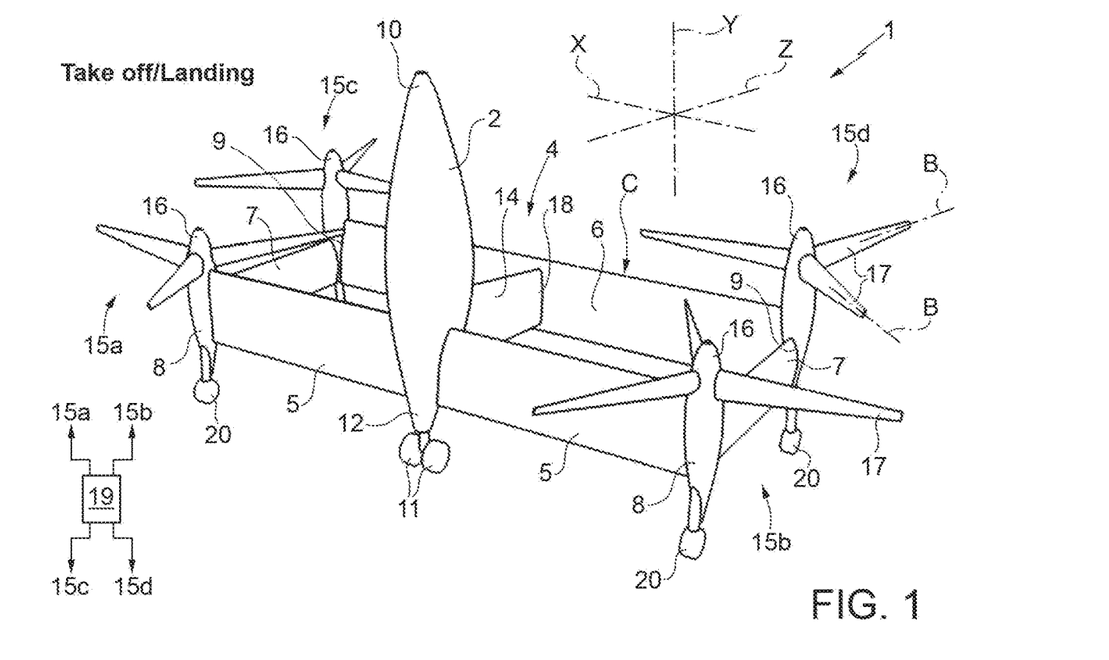
FIG. 1 is a perspective view of an embodiment of the tail sitter shown only for illustrative purposes, in a Take-off/landing position.
Figure 2:
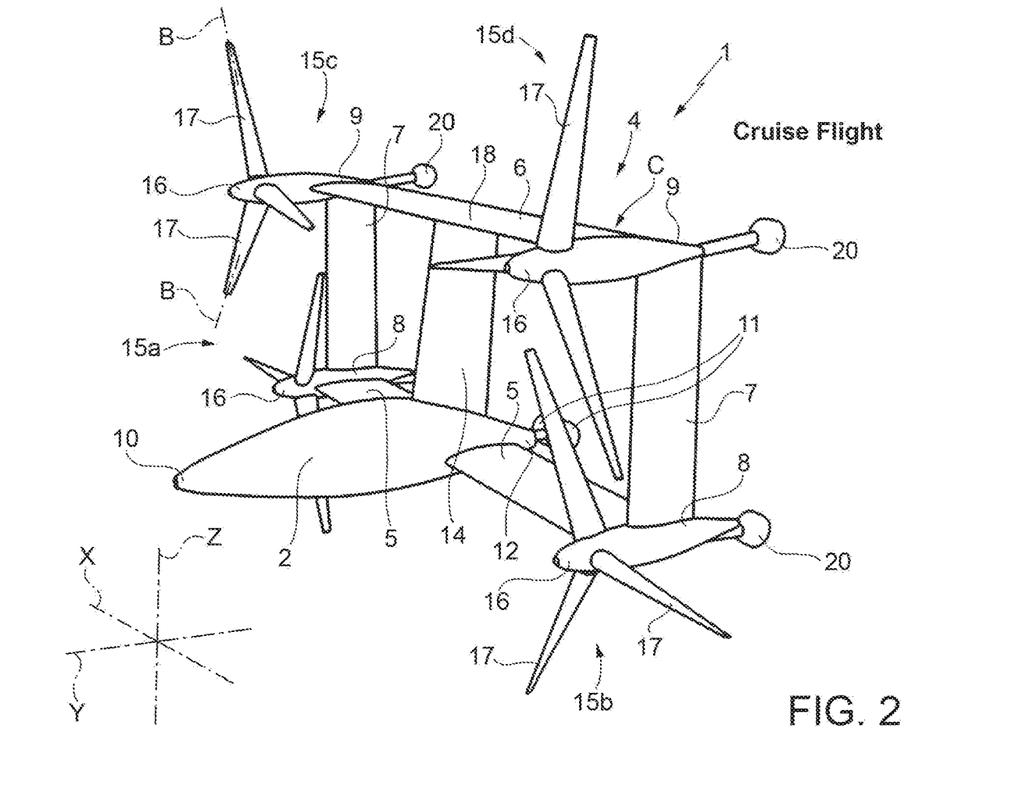
FIG. 2 is a perspective view of the tail sitter of FIG. 1, in a cruising position.

Referring to FIGS. 1 and 2, reference numeral 1 indicates a tail sitter shown only for illustrative purposes.

The aircraft 1 comprises a fuselage 2.

It is possible to identify a set of three axes integral with the aircraft 1, having an origin at the barycentre of the aircraft 1 and formed by:

an axis Y parallel to the extension direction of the fuselage 2;
an axis X orthogonal to the Y-axis; and
an axis Z orthogonal to the X-Y-axes.

The aircraft 1 can assume the cruising position (shown in FIG. 2) in the known manner. In this cruising position, the Y-axis is inclined with respect to the vertical direction. In particular, in the case of constant-height forward flight, the Y-axis is arranged horizontally.

The expression "cruising position" is used in this description to indicate a flight configuration in which the aircraft 1 proceeds with a velocity having at least a horizontal flight component.

Figure 8:
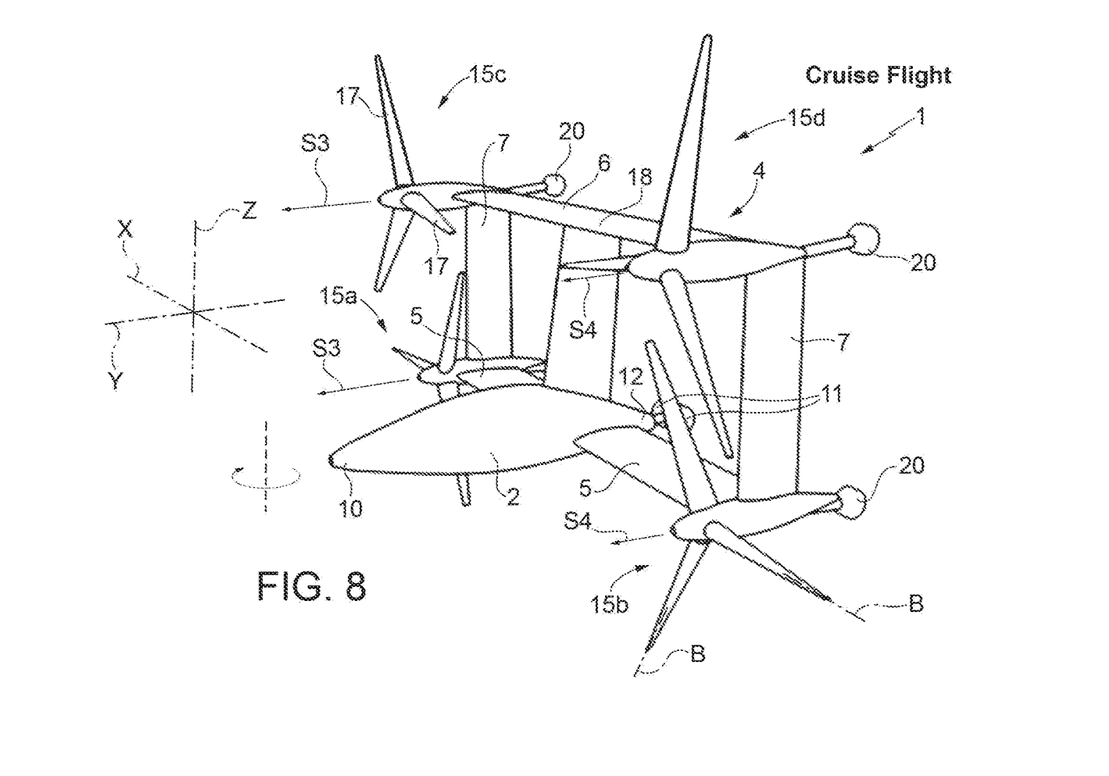

In this cruising position of the aircraft 1, rotations of the aircraft 1 about the X-Y-Z-axes are associated with following manoeuvres:

roll, namely rotation about the Y-axis (FIG. 6);
pitch, namely rotation about the X-axis (FIG. 4);
yaw, namely rotation about the Z-axis (FIG. 8).

The aircraft 1 can also assume a Take-off/landing position, shown in FIG. 1, where the Y-axis is arranged vertically.

Figure 7:
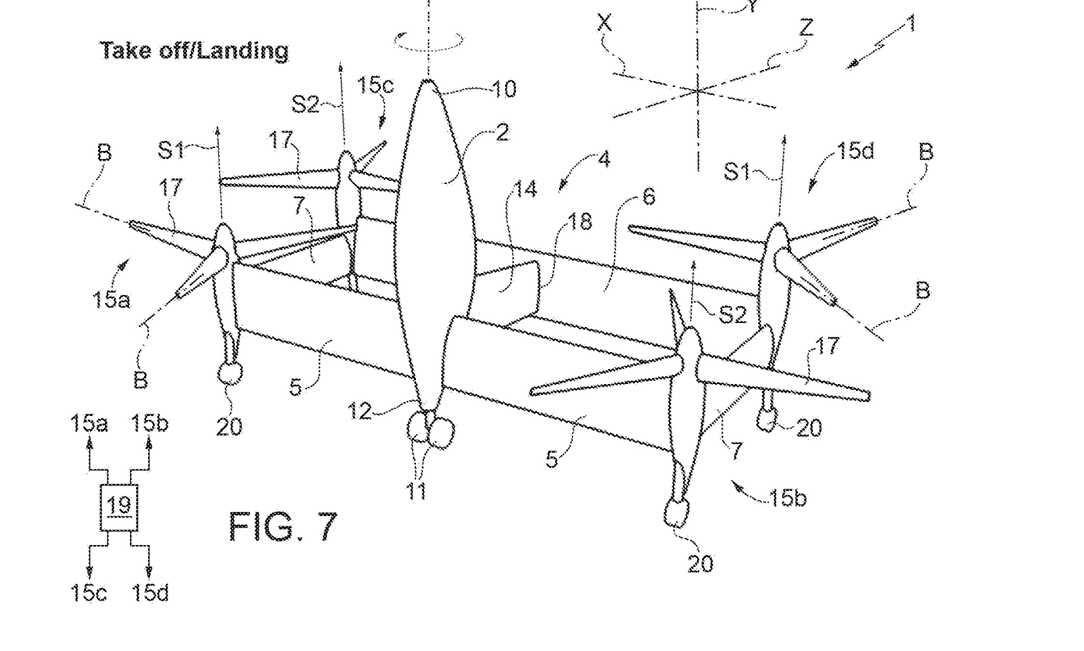
FIGS. 7 and 8 are perspective views of the tail sitter of FIGS. 1 and 2 during the execution of a third manoeuvre and respectively in the Take-off/landing position and in the cruising position.

In this Take-off/landing position, rotations of the aircraft 1 about the X-Y-Z-axes are associated with the following manoeuvres:

roll, namely rotation about the Z-axis (FIG. 5);
pitch, namely rotation about the X-axis (FIG. 3); and
yaw, namely rotation about the Y-axis (FIG. 7).

The flight profile of the aircraft 1 provides for a first transition from the Take-off position to the cruising position, maintaining the cruising position and a second transition from the cruising position to the landing position.

The aircraft 1 comprises a wing 4 with a closed front section C, which extends from the fuselage 2.

In this description, the term "wing with a closed front section" means a non-planar wing closed in on itself and without free ends.

The closed front section C is defined by the projection of the wing 4 on a plane orthogonal to the Y-axis.

In greater detail, the wing 4 basically comprises:

a pair of half-wings 5 projecting in a cantilever fashion from respective mutually opposite sides of the fuselage 2;
a portion 6 arranged above the half-wings 5 in a constant-height flight position of the aircraft 1; and a pair of connecting sections 7, each extending between respective free ends 8 of the half-wings 5 and respective free ends 9 of portion 6.

In the case shown, portion 6 and the half-wings 5 are parallel to each other.

The half-wings 5 and portion 6 have an extension direction mainly along the X-axis.

In the case shown, the overall length of the half-wings 5 along the X-axis is equal to the length of portion 6 along the X-axis.

In the case shown, the half-wings 5 and the portion 6 are also straight, with a constant chord, zero wing sweep and zero dihedral angle.

Sections 7 are parallel to each other and extend along the Z-axis, orthogonal to the X-Y-axes.

The aircraft 1 also comprises a further connecting section 14 extending between the fuselage 2 and a median section 18 of portion 6.

In particular, section 14 extends along the direction Z parallel to and centred between sections 7.

In the case shown and with reference to a cruising position of the aircraft 1, portion 6 is arranged above the half-wings 5.

The fuselage 2 also comprises a pair of landing members 11 arranged on a tail 12 of the fuselage 2.

The wing 4 also supports:
a plurality, four in the case shown, of engines 15a, 15b, 15c and 15d carried by the wing 4; and
a plurality of landing members 20, which rest on the ground when the aircraft 1 is in the Take-off/landing position.

Each engine 15a, 15b, 15c and 15d comprises, in particular:
a hub 16 (only indicated in FIGS. 1 and 2) rotating about a respective axis A parallel to the Y-axis and driven in rotation by a drive member that is not shown; and
a plurality of blades 17 projecting in a cantilever fashion from the hub 16 along respective axes B.

In particular, the blades 17 integrally rotate with the hub 16 about the respective axis A.

The hubs 16 of the engines 15a, 15b, 15c and 15d rotate about their respective axes A in different rotation directions from one another.

The axes A of the hubs 16 of the engines 15a, 15b, 15c and 15d are incident on the front section C of the wing 4.

In other words, the axes A are arranged along the front section C of the wing 4.

The axes A of the hubs 16 of engines 15a and 15b are incident on the front section C on the respective half-wings 5.

The axes A of the hubs 16 of engines 15c and 15d are incident on the front section C on portion 6 of the wing 4.

More specifically, the axes A of the hubs 16 of the engines 15a, 15b, 15c and 15d are arranged on the intersecting corners between the half-wings 5 and sections 7, and between sections 7 and portion 6.

In particular, the axes A of the hubs 16 of engines 15a and 15b are arranged on the intersecting corners between the half-wings 5 and sections 7, i.e. on the ends 8 of the respective half-wings 5.

The axes A of the hubs 16 of the engines 15c and 15d are arranged on the intersecting corners between sections 7 and portion 6, i.e. on the ends 9 of portion 6.

Engines 15a and 15c and engines 15b and 15d are arranged on respective mutually opposite lateral sides with reference to a median plane of the fuselage 2 parallel to the Y-Z-axes and orthogonal to the X-axis.

Engine 15c is arranged above engine 15a and engine 15d is arranged above engine 15b, with reference to a cruising condition of the aircraft 1 (FIG. 1).

In particular, engines 15a and 15d can rotate in a first rotation direction, for example clockwise (anticlockwise). Engines 15b and 15c can rotate in a second rotation direction, for example anticlockwise (clockwise).

In the case shown, the aircraft 1 comprises a control unit 19 (only schematically shown in FIGS. 1, 3, 5 and 7) programmed to control, independently of one another, the angular velocity of the engines 15a, 15b, 15c and 15d about their respective axes A of rotation and the collective pitch angle of the blades 17 with respect to the airflow.

In this way, the control unit 19 is programmed to control the thrust generated by the respective engines 15a, 15b, 15c and 15d independently of each other.

The blades 17 project in a cantilever fashion from the wing 4 on the side towards the nose 10 of the fuselage 2.

The cyclic pitch of the blades 17 of each engine 15a, 15b, 15c and 15d is fixed.

The landing members 20 are positioned on the intersection corners between the half-wings 5 and sections 7, and between sections 7 and portion 6.

The landing members 20 protrude from the wing 4 on the side towards the tail 12 of the fuselage 2.

In the case shown, there are four landing members 20.

The aircraft 1 does not have a tail fin or further movable wing structures other than the wing 4.

In other words, the roll, pitch and yaw movements of the aircraft 1 are exclusively controlled by adjusting the thrust of the engines 15a, 15b, 15c and 15d and the operation of the ailerons 21.

The aircraft 1 could be a drone provided with appropriate equipment on the fuselage 2.

Alternatively, the fuselage 2 could accommodate a crew.

In a further embodiment that is not shown, the aircraft 1 might not comprise the fuselage 2 and be formed by just the wing 4 and, if necessary, by a sensor, for example an antenna, arranged on the wing 4.

Operation of the aircraft 1 is described starting from a Take-off condition (FIG. 1) wherein the Y-axis of the fuselage 2 is arranged vertically and the landing members 11 and 20 support the aircraft 1 on the ground.

Operating the engines 15a, 15b, 15c and 15d causes the aircraft 1 to lift off. In this phase, the engines 15a, 15b, 15c and 15d counter and overcome the effect of the weight of aircraft 1, enabling lift off from the ground.

Then, the aircraft 1 performs a first transition, at the end of which it achieves a cruising position in which the Y-axis of the fuselage 2 is inclined with respect to the vertical direction and, in the case of constant-height flight, is substantially horizontal.

In this phase, the engines 15a, 15b, 15c and 15d counter the air resistance and the wing 4 generates the lift necessary to maintain the aircraft 1 in flight.

Later, the aircraft 1 performs a second transition, at the end of which it achieves a landing position entirely similar to the Take-off position. In this landing position, the Y-axis of the fuselage 2 is parallel to a vertical direction and the engines 15a, 15b, 15c and 15d counter the effect of the weight of aircraft 1, enabling a gradual approach to the ground.

The altitude of the aircraft 1 gradually decreases until the landing members 20 rest on the ground, thereby resulting in the completion of the landing manoeuvre.

During the aforementioned flight phases, the aircraft 1 is controlled as follows.

Figure 6:
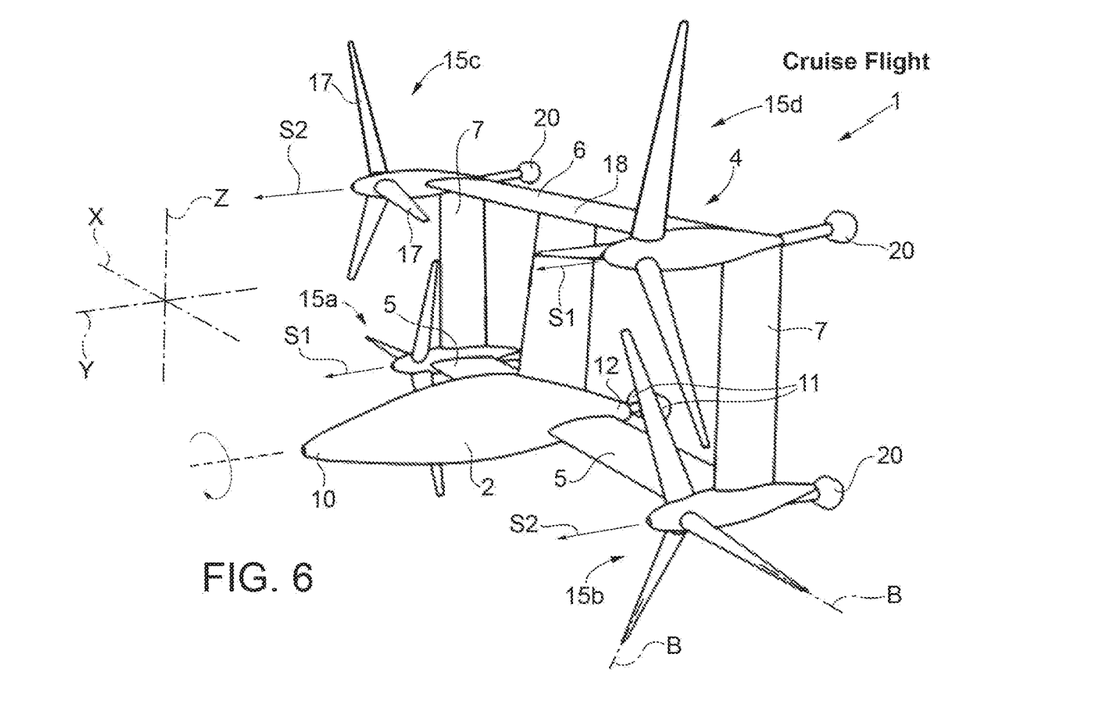

The inclination about the Y-axis is obtained and controlled by setting first thrust values S1 on engines 15a and 15d and second thrust values S2, different from S1, on engines 15b and 15c, so as to obtain torque parallel to the Y-axis acting on the aircraft 1 (FIGS. 6 and 7).

Rotation of the aircraft 1 about the Y-axis corresponds to a roll manoeuvre in the cruising position (FIG. 6) and a yaw manoeuvre in the Take-off/landing position (FIG. 7).

It is important to note that when the thrust S1 of rotors 15a and 15d increases, the thrust S2 of engines 15b and 15c decreases by the same value. In this way, the resulting overall thrust on the aircraft 1 does not change, while torque is generated about the Y-axis that causes rotation of the aircraft 1 about the Y-axis.

Figure 5:
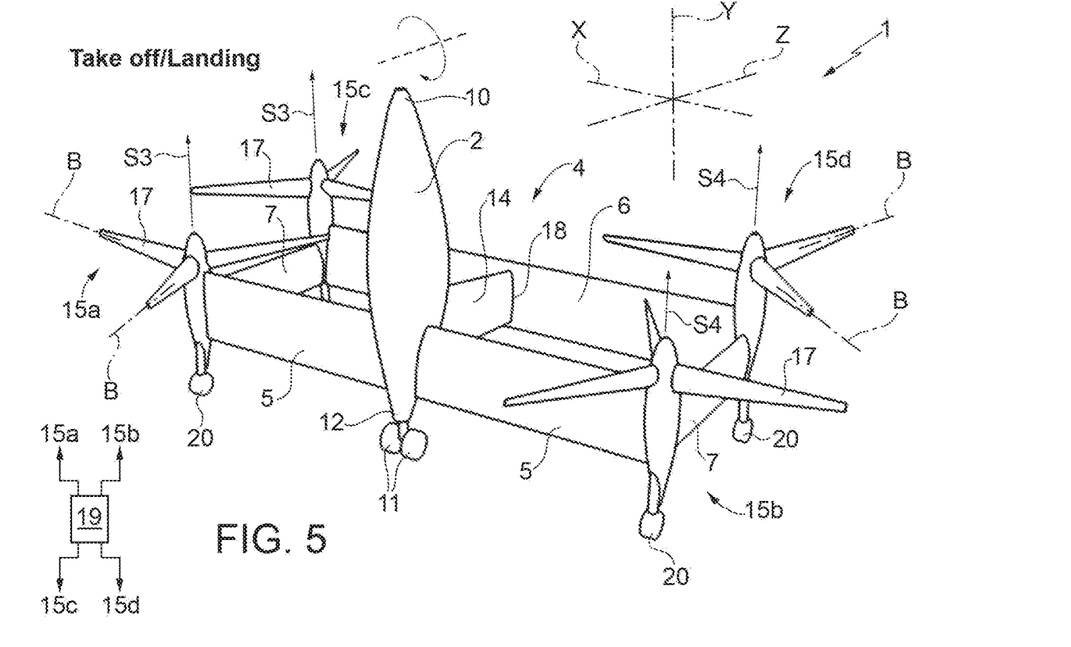
FIGS. 5 and 6 are perspective views of the tail sitter of FIGS. 1 and 2 during the execution of a second manoeuvre and respectively in the Take-off/landing position and in the cruising position.

Furthermore, the inclination about the Z-axis is obtained and controlled by setting first thrust values S3 on engines 15a and 15c and second thrust values S4, different from S3, on engines 15b and 15d, so as to obtain torque parallel to the Z-axis acting on the aircraft 1 (FIGS. 5 and 8).

Rotation of the aircraft 1 about the Z-axis corresponds to a yaw manoeuvre in the cruising position (FIG. 8) and a roll manoeuvre in the Take-off/landing position (FIG. 5).

Figure 3:
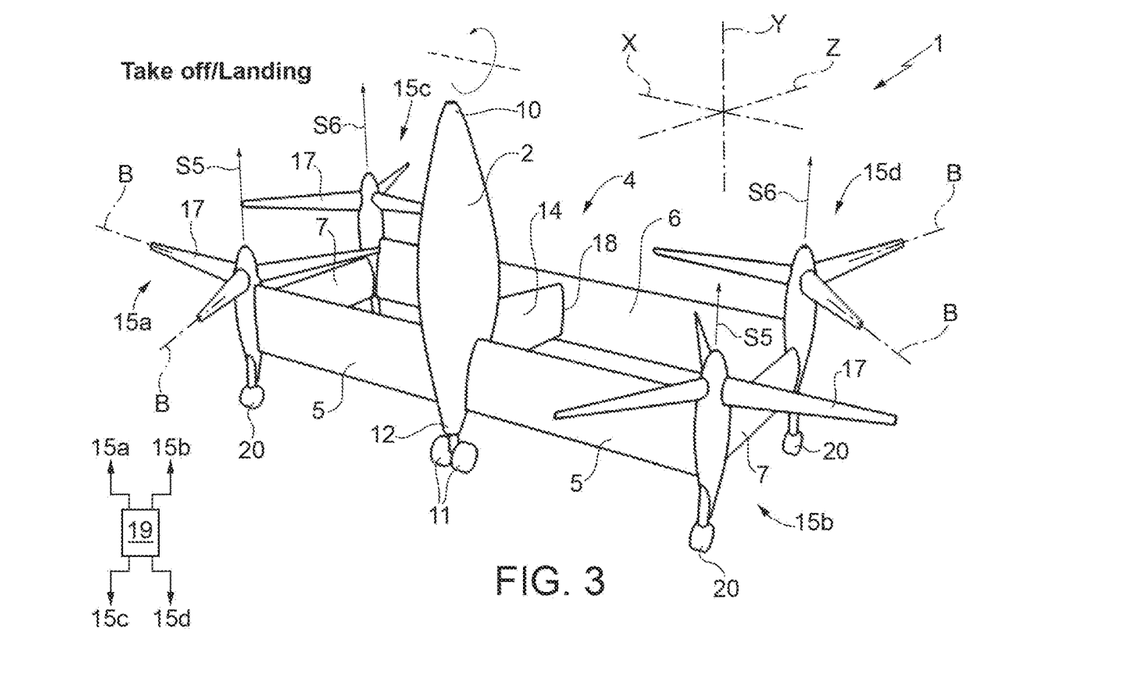
FIGS. 3 and 4 are perspective views of the tail sitter of FIGS. 1 and 2 during the execution of a first manoeuvre and respectively in the Take-off/landing position and in the cruising position.
Figure 4:
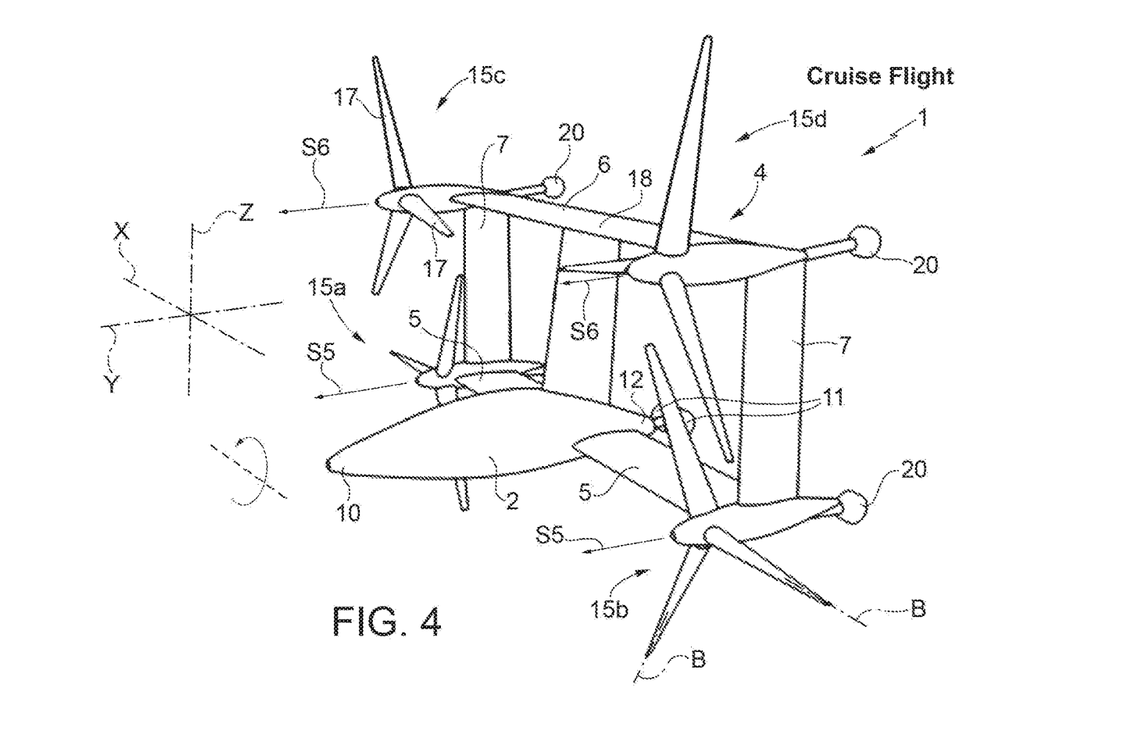

The inclination of the aircraft 1 about the X-axis is obtained and controlled by setting first thrust values S5 on engines 15a and 15b and second thrust values S6, different from S5, on engines 15c and 15d, so as to obtain torque parallel to the X-axis acting on the aircraft 1 (FIGS. 3 and 4).

Rotation of the aircraft 1 about the X-axis corresponds to a pitch manoeuvre both in the cruising position (FIG. 4) and in the Take-off/landing position (FIG. 3).

Figure 9:
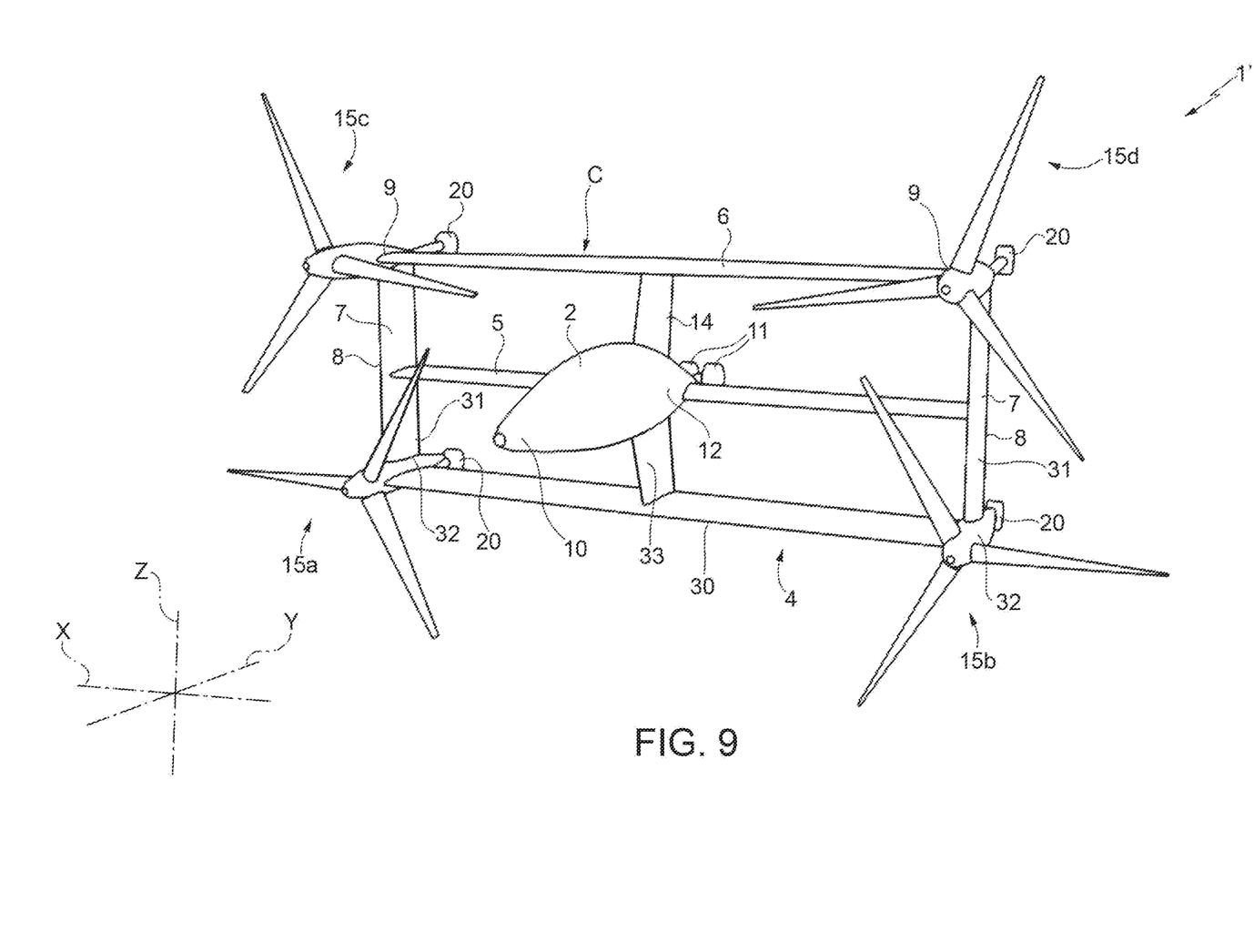
FIG. 9 is a perspective view of an embodiment of the tail sitter made according to the teachings of the present invention.

Referring to FIG. 9, reference numeral 1' indicates a tail sitter according to an embodiment of the present invention.

Aircraft 1' is similar to aircraft 1 and will be described hereinafter only with regard to the differences; where possible, identical and corresponding parts of aircraft 1' and aircraft 1 will be indicated with the same reference numerals.

In particular, aircraft 1' differs from aircraft 1 in that the wing 4 comprises a further portion 30, arranged below the half-wings 5 with reference to a cruising position of aircraft 1.

Portion 30 and the half-wings 5 are connected by sections 31 at respective free ends 32 and 8. In addition, a centre section of portion 30 is connected to the fuselage 2 by a section 33 interposed between sections 31 along the X-axis. Sections 31 and 33 extend parallel to the Z-axis.

Portion 30 is provided with further landing members 20.

The operation of aircraft 1' is similar to that of aircraft 1 and is therefore not described in detail.

From an examination of the characteristics of the tail sitter 1', the advantages that can obtained therewith are evident.

In particular, engines 15c and 15d are staggered with respect to engines 15a and 15b parallel to the Z-axis and the axes A of the engines 15a, 15b, 15c and 15d are incident on the front section C of the wing 4.

This means that, on one hand, it is possible to increase the aerodynamic efficiency of the aircraft 1' in the cruising position due to the greater aerodynamic efficiency of the shape of the wing 4 configured to support engines 15c and 15d in a staggered position with respect to engines 15a and 15b along the Z-axis.

On the other hand, because the axes A are incident on the front section C, it is possible to avoid the support structures and the further half-wings present in known solutions and discussed in the introductory part of this description.

In this way, it is possible to achieve high performance in cruising conditions with a configuration of the aircraft 1' that is particularly simple to obtain with respect to known solutions and discussed in the introductory part of this description.

In fact, unlike the aforementioned known solutions, the increase in aerodynamic efficiency of the wing 4 is not achieved by staggering the axes of the engines from the front section C of the wing 4, so as to deflect the airflow by generating an additional pressure gradient on the wing.

On the contrary, the increase in aerodynamic efficiency of the wing 4 is achieved by shaping the wing 4 with a two-dimensional or even closed layout.

In addition, the aircraft 1' does not require the presence of tail fins to ensure longitudinal stability. Actually, aircraft 1' does not even require the presence of canards or tail wing surfaces, enabling longitudinal stability to be assured by the relative positioning and wing profiles of the half-wings 5 and portion 6. This enables a further reduction in the complexity and weight of the aircraft 1'.

Control of rotation about the X-Y-Z-axes in the cruising position and the Take-off/landing position is achieved by simply controlling the thrust S5, S6, S1, S2, S3 and S4 of the engines 15a, 15b, 15c and 15d in a differential manner.

The engines 15a, 15b, 15c and 15d and the landing members 20 are carried by the wing 4. This means that in the case where the aircraft 1' is unmanned, it is possible to reduce the fuselage 2 to a minimum, or even eliminate it, obtaining a particularly light aircraft 1' of reduced complexity.

Finally, in the case where the aircraft 1' is unmanned, it might not even comprise the fuselage 2. In these circumstances, the aircraft 1' would be formed substantially by the wing 4 and by any equipment, for example an antenna or a sensor or a load mounted on-board the wing 4.

The engines 15a, 15b, 15c and 15d are all carried by the wing 4. In consequence, the fuselage 2 is not directly impacted by the vibrations generated by further engines mounted directly thereon.

In the case where the fuselage 2 accommodates a crew, this allows raising crew comfort. Contrariwise, in the case where the fuselage 2 only houses sensors or equipment, this allows making the position of the sensors and equipment more stable over time.

As a result of what has been indicated in the foregoing, the aircraft 1' enables making the tail sitter design solution usable, overcoming the numerous drawbacks that have prevented its development.

This is even more advantageous if the aircraft 1' is unmanned. In fact, in these circumstances, the aircraft 1' does not even have the inevitable drawback of tail sitters requiring particularly uncomfortable crew positions during Take-off/landing manoeuvres.

Finally, it is clear that modifications and variants can be made to the tail sitter 1' described and illustrated herein without departing from the scope defined in the appended claims.

In particular, the wing 4 could be shaped like a ring, diamond or polygon.

Furthermore, the single wing 4 could have an open two-dimensional front section C, for example a C-shaped front section.

The invention claimed is:

1. A tail sitter aircraft (1'), comprising:
a fuselage (2) arranged, in use, vertically in a Take-off/landing position of said aircraft (1');
a single wing (4);

at least two first engines (15*a*, 15*b*) configured to exert, in use, respective first thrusts (S1, S5, S3; S2, S5, S4) directed along respective first axes (A) on said tail sitter (1, 1'); and at least two second engines (15*c*, 15*d*) rotating about respective second axes (A) arranged above said first axes (A) of said first engines (15*a*, 15*b*), with reference to said cruising position; said at least two second engines (15*c*, 15*d*) being configured to exert, in use, respective second thrusts (S2, S6, S3; S1, S6, S4) directed along respective second axes (A) on said tail sitter (1');

said first and second engines (15*a*, 15*b*; 15*c*, 15*d*) being carried by said single wing (4);

said single wing (4) comprising a first portion (5) and a second portion (6) mutually staggered from one another;

said second portion (6) being arranged, in use, above said first portion (5), with reference to said cruising position of said aircraft (1');

said first portion (5) comprising two half-wings (5), which extend from opposite lateral sides of said fuselage (2);

said fuselage (2) being arranged, in use, transversely to a vertical direction in a cruising position of said aircraft (1');

said wing (4) further comprising a third portion (30) arranged, in use, below said first portion (5) with reference to said cruising position of said aircraft (1'); characterized in that said single wing (4) comprises:

a first and a second connecting section (7), which are interposed between respective ends (8, 9) of said first portion (5) and of said second portion (6);

wherein said first engines (15*a*, 15*b*) are arranged on respective first ends (8) of said first portion (5);

said second engines (15*c*, 15*d*) being arranged on respective second ends (9) of said second portion (6).

2. The aircraft according to claim 1, characterized by being a drone or in that said fuselage (2) is configured to accommodate a crew.

3. A tail sitter aircraft (1'), comprising:

a fuselage (2) arranged, in use, vertically in a Take-off/landing position of said aircraft (1');

a single wing (4);

at least two first engines (15*a*, 15*b*) configured to exert, in use, respective first thrusts (S1, S5, S3; S2, S5, S4) directed along respective first axes (A) on said tail sitter (1, 1'); and at least two second engines (15*c*, 15*d*) rotating about respective second axes (A) arranged above said first axes (A) of said first engines (15*a*, 15*b*), with reference to said cruising position; said at least two second engines (15*c*, 15*d*) being configured to exert, in use, respective second thrusts (S2, S6, S3; S1, S6, S4) directed along respective second axes (A) on said tail sitter (1');

said first and second engines (15*a*, 15*b*; 15*c*, 15*d*) being carried by said single wing (4);

said single wing (4) comprising a first portion (5) and a second portion (6) mutually staggered from one another;

said second portion (6) being arranged, in use, above said first portion (5), with reference to said cruising position of said aircraft (1');

said first portion (5) comprising two half-wings (5), which extend from opposite lateral sides of said fuselage (2);

said fuselage (2) being arranged, in use, transversely to a vertical direction in a cruising position of said aircraft (1');

said wing (4) further comprising a third portion (30) arranged, in use, below said first portion (5) with reference to said cruising position of said aircraft (1'); characterized in that said single wing (4) comprises:

a first and a second connecting section (7), which are interposed between respective ends (8, 9) of said first portion (5) and of said second portion (6);

wherein said wing (4) has a closed front section (C); said wing (4) being a non-planar wing closed in on itself and without free ends; said front section (C) being defined by the projection of said wing (4) on a plane orthogonal to a third axis (Y) parallel to the extension direction of said fuselage (2).

4. The aircraft of claim 3, characterized in that said third portion (30) and said first portion (5) are connected by first sections (31) at respective ends (32, 8).

5. The aircraft of claim 4, characterized in that a centre of said third portion (30) is connected to said fuselage (2) by a second section (33) interposed between first sections (31) along a fourth axis (X); said first and second sections (31, 33) extend parallel to a fifth axis (Z), orthogonal to said fourth axis (X).

6. A tail sitter aircraft (1'), comprising:

a fuselage (2) arranged, in use, vertically in a Take-off/landing position of said aircraft (1');

a single wing (4);

at least two first engines (15*a*, 15*b*) configured to exert, in use, respective first thrusts (S1, S5, S3; S2, S5, S4) directed along respective first axes (A) on said tail sitter (1, 1'); and at least two second engines (15*c*, 15*d*) rotating about respective second axes (A) arranged above said first axes (A) of said first engines (15*a*, 15*b*), with reference to said cruising position; said at least two second engines (15*c*, 15*d*) being configured to exert, in use, respective second thrusts (S2, S6, S3; S1, S6, S4) directed along respective second axes (A) on said tail sitter (1');

said first and second engines (15*a*, 15*b*; 15*c*, 15*d*) being carried by said single wing (4);

said single wing (4) comprising a first portion (5) and a second portion (6) mutually staggered from one another;

said second portion (6) being arranged, in use, above said first portion (5), with reference to said cruising position of said aircraft (1');

said first portion (5) comprising two half-wings (5), which extend from opposite lateral sides of said fuselage (2);

said fuselage (2) being arranged, in use, transversely to a vertical direction in a cruising position of said aircraft (1');

said wing (4) further comprising a third portion (30) arranged, in use, below said first portion (5) with reference to said cruising position of said aircraft (1'); characterized in that said single wing (4) comprises:

a first and a second connecting section (7), which are interposed between respective ends (8, 9) of said first portion (5) and of said second portion (6);

wherein said first engines (15*a*, 15*b*) each comprise a relative hub (16) rotating about a relative first axis (A) and a plurality of blades (17) extending in a cantilever fashion from said hub (16) and having respective pitch angles;

said aircraft (1') further comprising a control unit (19) programmed to adjust said angular velocity of said hub (16) and said pitch angles of said blades (17) of each first and second engine (15*a*, 15*b*) independently of the pitch angles of said blades (17) and of the rotation velocity of said hub (16) of the remaining said first and second engines (15*a*, 15*b*; 15*c*, 15*d*); said cyclic pitch of said blades (7) being fixed.

7. The aircraft according to claim 6, wherein said first engines (15a, 15b) are arranged on respective first ends (8) of said first portion (5); said second engines (15c, 15d) being arranged on respective second ends (9) of said second portion (6); and characterized in that the control unit (19) is programmed, in case it is necessary to rotate said aircraft (1') about said third axis (Y), to control said first and second engines (15a, 15b; 15c, 15d) such that:
- one (15a) of said first engines (15a, 15b) generates a first value (S1) of said first thrust (S1, S5, S3; S2, S5, S4) and the other (15b) of said first engines (15a, 15b) generates a second value (S2) of said second thrust (S2, S6, S3; S1, S6, S4) different from said first value (S1); and
- one (15d) of said second engines (15c, 15d) generates said first value (S1) of said second thrust (S2, S6, S3; S1, S6, S4) and the other (15c) of said second engines (15c, 15d) generates said value (S2) of said second thrust (S2, S6, S3; S1, S6, S4) different from said first value (S1);

said one (15a) of said first engines (15a, 15b) and the other (15b) of said first engines (15a, 15b) being arranged on mutually opposite lateral sides of a median plane of said fuselage (2) parallel to said third axis (Y) and orthogonal to a fourth axis (X) substantially parallel to the extension direction of one of said second portion (5) and third portion (6);

said one (15c) of said second engines (15c, 15d) and the other (15d) of said second engines (15c, 15d) being arranged on mutually opposite lateral sides of said median plane of said fuselage (2).

8. The aircraft according to claim 7, characterized in that:
- said hub (16) of one (15a) of said first engines (15a, 15b) is rotatable in a first rotation direction and said hub (16) of the other (15b) of said first engines (15a, 15b) is rotatable in a second rotation direction, opposite to said first rotation direction;
- said hub (16) of one (15d) of said second engines (15c, 15d) is rotatable in said first rotation direction and said hub (16) of the other (15c) of said second engines (15c, 15d) is rotatable in said second rotation direction;
- one (15a) of said first engines (15a, 15b) and one (15c) of said second engines (15c, 15d) are arranged on a first lateral side of said median plane of said fuselage (2), and the other (15b) of said first engines (15a, 15b) and the other (15d) of said second engines (15c, 15d) are arranged on a second lateral side of said fuselage (2) opposite to said first lateral side with respect to said median plane of said fuselage (2);
- said hubs (16) of said first engines and second engines (15a, 15c; 15b, 15d) are arranged on the same lateral side with respect to said median plane of said fuselage (2) with one being rotatable in said first rotation direction and the other in said second rotation direction.

9. The aircraft according to claim 6, characterized in that said control unit (19) is programmed, in case it is necessary to rotate said aircraft (1') about said fourth axis (X), to control said first and second engines (15a, 15b; 15c, 15d) such that said first engines (15a, 15b) generate a third value (S5) of said first thrust (S1, S5, S3; S2, S5, S4), and said second engines (15c, 15d) generate a fourth value (S6) of said second thrust (S2, S6, S3; S1, S6, S4); said third value (S5) and fourth value (S6) being different from each other.

10. The aircraft according to claim 6, characterized in that said control unit (19) is programmed, in case it is necessary to rotate said aircraft (1') about a fifth axis (Z) orthogonal to said third axis (Y) and fourth axis (X), to control said first and second engines (15a, 15b; 15c, 15d) such that:
- one (15a) of said first engines (15a, 15b) generates a fifth value (S3) of said first thrust (S1, S5, S3; S2, S5, S4) and the other (15b) of said first engines (15a, 15b) generates a sixth value (S4) of said first thrust (S1, S5, S3; S2, S5, S4) different from said fifth value (S3); and
- one (15c) of said second engines (15c, 15d) generates said fifth value (S3) of said second thrust (S2, S6, S3; S1, S6, S4) and the other (15d) of said second engines (15c, 15d) generates said sixth value (S4) of said second thrust (S2, S6, S3; S1, S6, S4) different from said fifth value (S3);

said one (15a) of said first engines (15a, 15b) and one (15c) of said second engines (15c, 15d) being arranged on the same first lateral side of said median plane of said fuselage (2);

said other (15b) of said first engines (15a, 15b) and the other (15d) of said second engines (15c, 15d) being arranged on the same second lateral side of said fuselage (2) opposite to said first lateral side with respect to said median plane of said fuselage (2).

11. A tail sitter aircraft (1'), comprising:
- a fuselage (2) arranged, in use, vertically in a Take-off/landing position of said aircraft (1');
- a single wing (4);
- at least two first engines (15a, 15b) configured to exert, in use, respective first thrusts (S1, S5, S3; S2, S5, S4) directed along respective first axes (A) on said tail sitter (1, 1'); and
- at least two second engines (15c, 15d) rotating about respective second axes (A) arranged above said first axes (A) of said first engines (15a, 15b), with reference to said cruising position; said at least two second engines (15c, 15d) being configured to exert, in use, respective second thrusts (S2, S6, S3; S1, S6, S4) directed along respective second axes (A) on said tail sitter (1');

said first and second engines (15a, 15b; 15c, 15d) being carried by said single wing (4);

said single wing (4) comprising a first portion (5) and a second portion (6) mutually staggered from one another;

said second portion (6) being arranged, in use, above said first portion (5), with reference to said cruising position of said aircraft (1');

said first portion (5) comprising two half-wings (5), which extend from opposite lateral sides of said fuselage (2);

said fuselage (2) being arranged, in use, transversely to a vertical direction in a cruising position of said aircraft (1');

said wing (4) further comprising a third portion (30) arranged, in use, below said first portion (5) with reference to said cruising position of said aircraft (1');

characterized in that said first engines (15a, 15b) are arranged on respective first ends (8) of said first portion (5);

said second engines (15c, 15d) being arranged on respective second ends (9) of said second portion (6).

12. A tail sitter aircraft (1'), comprising:
- a fuselage (2) arranged, in use, vertically in a Take-off/landing position of said aircraft (1');
- a single wing (4);
- at least two first engines (15a, 15b) configured to exert, in use, respective first thrusts (S1, S5, S3; S2, S5, S4) directed along respective first axes (A) on said tail sitter (1, 1'); and
- at least two second engines (15c, 15d) rotating about respective second axes (A) arranged above said first axes (A) of said first engines (15a, 15b), with reference to said cruising position; said at least two second engines (15*c*, 15*d*) being configured to exert, in use, respective second thrusts (S2, S6, S3; S1, S6, S4) directed along respective second axes (A) on said tail sitter (1');

said first and second engines (15*a*, 15*b*; 15*c*, 15*d*) being carried by said single wing (4);

said single wing (4) comprising a first portion (5) and a second portion (6) mutually staggered from one another;

said second portion (6) being arranged, in use, above said first portion (5), with reference to said cruising position of said aircraft (1');

said first portion (5) comprising two half-wings (5), which extend from opposite lateral sides of said fuselage (2);

said fuselage (2) being arranged, in use, transversely to a vertical direction in a cruising position of said aircraft (1');

said wing (4) further comprising a third portion (30) arranged, in use, below said first portion (5) with reference to said cruising position of said aircraft (1');

characterized in that said wing (4) has a closed front section (C); said wing (4) being a non-planar wing closed in on itself and without free ends; said front section (C) being defined by the projection of said wing (4) on a plane orthogonal to a third axis (Y) parallel to the extension direction of said fuselage (2).

* * * * *